United States Patent

[11] 3,538,831

| [72] | Inventor | Arthur C. Mueller<br>Niles, Illinois |
|---|---|---|
| [21] | Appl. No. | 735,284 |
| [22] | Filed | June 7, 1968 |
| [45] | Patented | Nov. 10, 1970 |
| [73] | Assignee | Bell & Howell Company<br>Chicago, Illinois<br>a corporation of Illinois |

[54] ELECTRICAL CAMERA FOCUSING MECHANISM
10 Claims, 5 Drawing Figs.

[52] U.S. Cl. ................................................... 95/44,
352/140
[51] Int. Cl. ...................................................... G03b 3/00
[50] Field of Search ............................................ 95/44, 45;
352/139, 140; 353/101; 350/3, 8, 16, 41, 46

[56] References Cited
UNITED STATES PATENTS

| 1,258,459 | 3/1918 | Read | 95/44(C)UX |
|---|---|---|---|
| 1,301,897 | 4/1919 | Becker | 95/44(C)UX |
| 2,456,317 | 12/1948 | Rabinou | 352/140X |
| 2,955,518 | 10/1960 | Perry | 350/187X |
| 3,450,018 | 6/1969 | John | 95/45 |

*Primary Examiner*—Norton Ansher
*Assistant Examiner*—Richard M. Sheer
*Attorneys*—William F. Pinsak and John E. Peele, Jr.

ABSTRACT: A pendulous member tends to rotate relative the camera into an electrical circuit-closing condition toward a position corresponding to focal distance as the camera is rotated for sighting the base of a subject. The circuit thus energized operates a motor to restore the pendulous member to circuit open position and simultaneously drive the objective of the camera to "in focus" condition.

Patented Nov. 10, 1970 3,538,831

Inventor:
Arthur C. Mueller
By William F. Pusick
John E. Peele Jr. Attys

Patented Nov. 10, 1970
3,538,831
Sheet 2 of 2
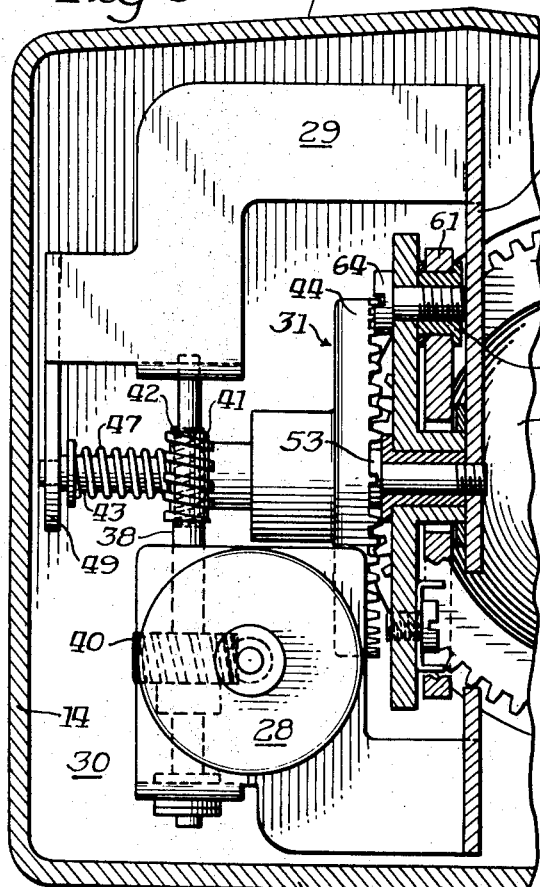
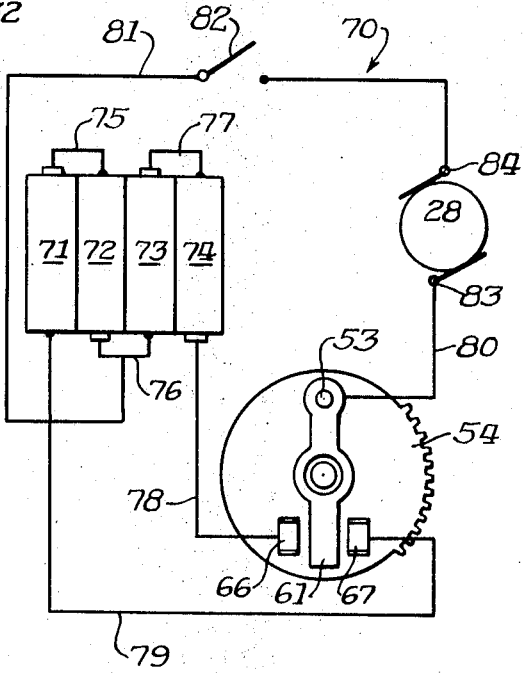
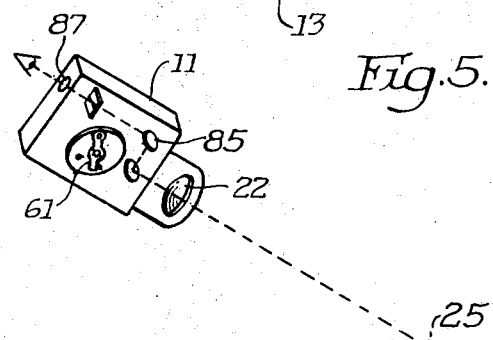
Inventor:
Arthur C. Mueller.
By
Attys

ELECTRICAL CAMERA FOCUSING MECHANISM

The present invention relates to a camera focusing mechanism. Particularly it relates to a mechanism for focusing an adjustable objective lens by triangulation employing a pendulous range finder.

Pendulous rangefinders for determining the distance between a camera and a subject (hereinafter referred to as focal distance) and employed in mechanical triangulation apparatus heretofore have been known. A copending application filed on even date herewith and assigned to the assignee of the present application annunciates the principles of mechanical triangulation and discloses improved means by which a pendulous rangefinder can be employed in a camera for fixing the position of an objective in an "in focus" condition. According to said copending application, a pendulous rangefinder swings to an angular aspect relative to an objective lens and corresponding to focal distance and in which said rangefinder is then locked by manual operation of mechanical means. The objective lens is then moved by direct manually applied torque to a predetermined distance from the rangefinder at which the objective lens is "in focus". While the achievement of that type of mechanism is wholly satisfactory, it is believed that there may be variations to it which will also prove acceptable.

It is an object of the present invention to provide a new and improved focusing mechanism for a camera with an adjustable objective lens.

It is another object of the invention to provide a camera with a mechanism of the described type which is exceedingly easy to use.

A further object of the invention is to minimize the procedure for focusing the adjustable objective lens of a camera by mechanical triangulation.

Moreover it is an object of the invention to minimize the psychological impediments to employment of a camera having an adjustable objective lens adapted to be focused by a mechanism having a rangefinder operative by mechanical triangulation.

The features of the invention for effecting the foregoing objects include a pendulous member which is arranged for swinging movement relative to the body of a camera having an objective lens assembly which is arranged from said body for focusing adjustment. The pendulous member is swingable between a first position in which said objective lens is conditioned "in focus" and a second position in which said objective lens is in an unfocused condition. Motive means responsive to the pendulous member when in the second position are provided for driving the objective lens toward an "in focus" condition and the pendulous member toward the first position. In one embodiment of the invention, the pendulous member is electrically conductive and closes a circuit with conductive means for operating said motive means.

Further and other objects will be apparent from the description of the accompanying drawings in which like numerals refer to like parts.

In the drawings:

FIG. 3 is a sectional view taken along section line 3-3 of FIG. 1.

FIG. 4 is a schematic of an electrical circuit for operating said embodiment.

FIG. 5 is a schematic illustrating the procedure for operating said embodiment.

Figure 1:
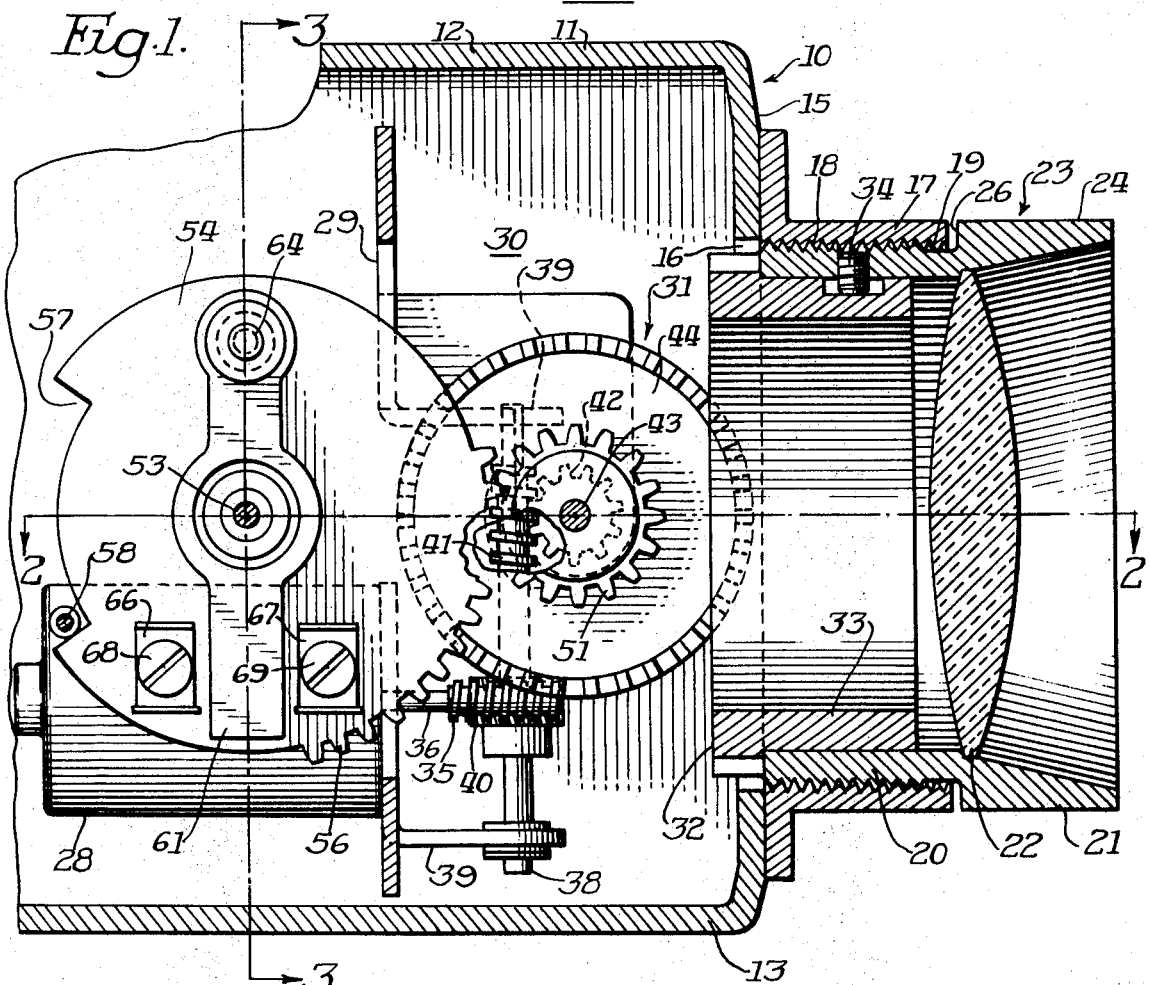
FIG. 1 is a sectional view through a camera, only a portion of which is shown, and illustrating one embodiment of the present invention.

Referring now more particularly to the drawings, there is shown a camera generally designated 10 and comprising a body 11 in the form of a casing oriented for the purpose of description with an upper wall 12, a floor 13, opposite side walls 14 (only one of which is shown in FIG. 3), and a forward wall 15 having a centrally disposed opening 16. An annular casing extension 17 having an internal thread 18 projects forwardly from wall 15 in concentric association with opening 16. Thread 18 is operatively engaged by an external thread 19 of a rearward annular extension 20 of a lens mount 21. The latter, together with a therein rigidly secured objective lens 22, comprises an objective lens assembly 23 which is adjustable longitudinally of the optical axis 25 (FIG. 5) of objective lens 22 as said assembly is rotated. Thereby objective lens 22 may be moved to an "in focus" condition, i.e., the focal plane of objective lens 22 may be brought into coincidence with the film plane of camera 10. The forward end portion 24 of lens mount 21 generates an outside annular shoulder 26 for limiting rearward movement of objective lens assembly 23 by engaging the forward end of casing extension 17. Because the position of the film will be readily recognized by those skilled in the art, it has been omitted from the drawings.

To adjust objective lens assembly 23, according to the present invention, motive means in the form of a small DC motor 28 (3 volt in the illustrated embodiment) is mounted from a hanger bracket 29 which is rigidly secured to body 11 within a body chamber 30. A power transmission 31 in the form of a gear assembly transmits motor torque to a gear ring 32 included in or connected to objective lens assembly 23. To that end, the hub 33 of gear ring 32 is secured within rear extension 20 in a manner such that gear ring 32 is disposed partially within the opening 16 and projects therefrom into chamber 30. The securance may be adjustable by means of a setscrew 34 (FIG. 1) which is threadable through rear extension 20 into a recess fashioned in hub 33 against which said setscrew impinges. Accordingly, as the gear ring 32 rotates, objective lens assembly 23 will rotate correspondingly for adjustment axially of optical axis 25.

The gear assembly defining the power transmission 31 comprises a worm screw 35 mounted on output shaft 36 (FIGS. 1 and 2) of motor 28. The opposite ends of another shaft 38 are journaled in a pair of spaced apart arms 39 which comprise an extension of hanger bracket 29. The arrangement of arms 39 is such that shaft 38 is disposed transversely of shaft 36 and rigidly supports a worm wheel 40 in operable mesh with worm screw 35 for transmitting the torque of motor 28 to worm screw 41 (FIGS. 1 and 3) which is also rigidly carried by shaft 38. A worm wheel 42, which is mounted loosely on another shaft 43 in driving association with worm screw 41, clutches a face gear 44 for selectively transmitting motor torque to shaft 43 and gear ring 32 with which face gear 44 operably meshes.

While the face gear 44 is rigidly secured to shaft 43 by a setscrew 46, worm wheel 42 maintains slip clutch association with the face gear 44 by a compression spring 47 which is tensioned to obviate overdriving the objective lens assembly 23 upon occurrences which will be apparent from the ensuing description.

The opposite ends of shaft 43 respectively are journaled in a boss 49 and a plate 50 which may be fashioned integrally with hanger bracket 29. Shaft 43 is disposed transversely of shaft 38 and carries a pinion 51 which is secured by means of a setscrew 52 (FIG. 2). An end threaded screw 53 whose shank projects normally from plate 50 in parallel relationship with shaft 43 provides an axis of rotation for a contact carrier 54 which is journaled on a bearing sleeve 55 secured about the shank of screw 53 between its head and the support plate 50, as illustrated in FIG. 2. Carrier 54 is disclike and has an arcuate peripheral gear sector 56 arranged in operable mesh with pinion 51. Opposite the gear sector 56, carrier 54 has a peripheral recess 57 (FIG. 1) in which there is engaged a relatively fixed lug 58 for abutting opposite sides of said recess 57 as carrier 54 is rocked. Recess 57 is proportioned for limiting angular carrier movement to a range which will preclude disengagement of the gear sector 56 and pinion 51 should motor 28 be driven beyond a predetermined range.

An electrically conductive pendulous member 61 is supported adjacent one face of carrier 54. A screw 64 is threaded through the carrier for that purpose so that its shank supports a journaling sleeve 65 (FIG. 3) from which pendulous member 61 rockably depends. A pair of electrical contacts 66 and 67 are rigidly secured to carrier 54 by means of a pair of screws 68 and 69 on opposite sides of pendulous member 61 in a manner such that when optical axis 25 is horizontal, i.e., normal to said pendulous member, the latter will be equally spaced from each of the electrical contacts 66 and 67, and motor 28 will be nonoperating even through a switch 82 (hereinafter to be more fully described) is closed. There is, however, a circuit assembly, generally designated 70 (FIG. 4), which is adapted to operate motor 28 when either contact 66 or 67 is engaged by pendulous member 61 for circuit closure.

Circuit assembly 70 comprises a voltage source, herein shown as a battery pack of four (1½ volt) batteries 71, 72, 73 and 74 which are series connected by means of: a conductor 75 between the positive terminal of battery 71 and the negative terminal of battery 72, a conductor 76 between the positive terminal of battery 72 and the negative terminal of battery 73, and a conductor 77 between the positive terminal of battery 73 and the negative terminal of battery 74. A circuit wire 78 connects the positive terminal of battery 74 to contact 66, and a circuit wire 79 connects the negative terminal of battery 71 to contact 67. A circuit wire 80 connects the mounted or upper end portion of pendulous member 61 to one terminal 83 of motor 28. The other terminal 84 of motor 28 is connected by a circuit wire 81 to conductor 76. A manually operable switch 82 is disposed in the circuit wire 81 and is arranged on body 11 for easy manipulation.

When the pendulous member 61 engages contact 66, it is adapted to close a circuit from the positive terminal of battery 74 through circuit wire 78, then through pendulous member 61 to terminal 83 and then terminal 84 and thereafter through circuit wire 81 to the negative terminal of battery 73 to drive motor 28 in one direction. The motor is adapted to be driven in an opposite direction when the pendulous member engages contact 67. This of course will cause current flow from the positive terminal of battery 72 through circuit wire 81, then through the motor from its terminal 84 to its terminal 83, and thereafter through pendulous member 61 to the negative terminal of battery 71 through the circuit wire 79.

Motor 28 once energized will operate to cut itself off by driving the carrier 54 in a direction which tends to disengage appropriate of contacts 66 and 67 from pendulous member 61. Simultaneously, the objective lens will be driven in a corresponding direction.

The manner in which the focusing mechanism operates will be appreciated by first referring to FIG. 5 in which it is seen that sighting means including objective lens 22 and a mirror assembly 85 is adapted to reflect the image of a subject 86 on a viewing screen in a manner such that said image can be observed through port 87. To bring the objective lens 22 to an "in focus" condition, camera 10 is rotated as in FIG. 5 so that the base of subject 86 is viewed from about the picture-taking position through port 87 to establish the angle corresponding to the focal distance as explained in said aforementioned copending application. Although pendulous member 61 tends to assume a corresponding angle relative to the body 11, initially such movement is curtailed by engagement with contact 67 which together with carrier 54 rotates with body 11 as the latter is moved to view the base of subject 86. As a result, the pendulous member is carried with body 11 relative to which it therefore then generates no significant angle. With the camera in base-sighting position, upon closure of switch 82 a circuit is completed through motor 28 which drives the carrier 54 counterclockwise from the position of FIG. 5 for an angular distance sufficient for pendulous member 61 to swing free, that is, to assume its vertical position and, accordingly, and angle relative to body 11 corresponding to focal distance. At that position, contact 67 has disengaged the pendulous member 61, and, consequently, motor 28 will stop operating.

When an operator is aware that the motor is no longer driving, he may release the switch 82, rotate camera 10 to a picture-taking attitude, and commence photography. That is because motive means and power transmission are synchronized in a manner such that objection lens assembly 23 will always be conditioned "in focus" when pendulous member 61 swings free from contact 67 while the switch 82 is closed.

Figure 2:
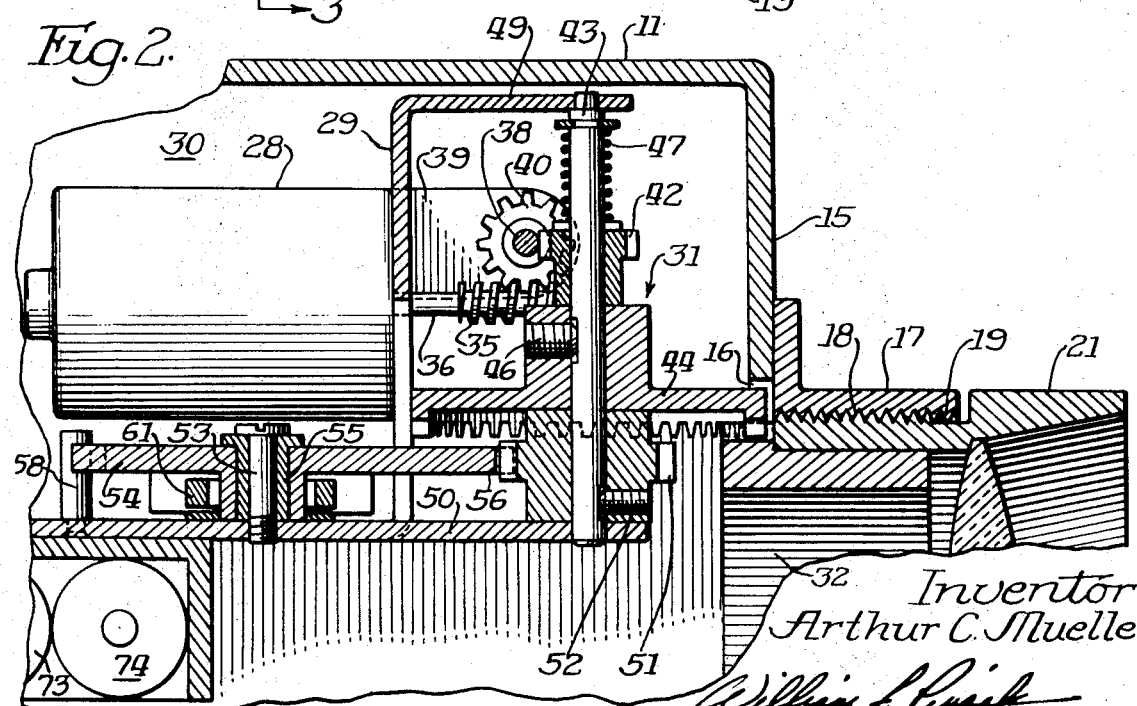
FIG. 2 is a sectional view taken along section line 2-2 of FIG. 1.

It is appreciated that once the objective lens has adjusted, as aforesaid, for a focal distance, switch 82 is opened and thereafter camera 10 assumes a normal attitude for photography, for example, in which the optical axis is horizontal, contact 66 may be engaged with the pendulous member 61 which then will have been rotated counterclockwise from the position of FIG. 1. However, there will be no effect on objective lens assembly 23 as along as switch 82 remains open. After completing photography, the parts may be restored to what may be considered a starting position, as illustrated in FIG. 1, in which the objective lens 22 is "in focus" only for a very distant subject by again manually closing switch 82. Thereupon, carrier 54 will be driven clockwise to disengage contact 66 and pendulous member 61. Objective lens assembly 23 of course will accordingly be driven from its previous "in focus" condition to the position in FIG. 1. When the operator no longer hears the motor 28, he may release the switch 82, assured the parts are in relationship to FIG. 1.

In the event that adjustment of parts is attempted while the camera 10 is at an angular attitude in which pendulous member 61 cannot be disengaged from a contact by angular movement of carrier 54 within the range of sector 56, lug 58 will stop rotation of said carrier, and even though motor 28 continues to drive, neither objective lens 23 or carrier 54 will be overdriven because the worm wheel 42 will slip against face gear 44.

It is to be understood that the embodiment shown is illustrative of the operation of a focusing mechanism for cameras which employ a pendulous rangefinder and that certain changes, alterations, modifications or substitutions can be made in the structure of the device without departing from the spirit and scope of the claims.

I claim:

1. In an optical instrument having a housing supporting a focusable objective lens assembly, the combination comprising:
   a pendulous member mounted for swinging movement relative to said housing toward an angular aspect corresponding to focal distance;
   a motor for reversibly driving said objective assembly;
   electrical means including a pair of circuits operable in response to angular orientation of said pendulous member for driving said motor; and
   contacts in said circuits mounted for rotary movement relative to the angular orientation of said pendulous member into circuit breaking condition for deenergizing said motor when said lens assembly is in focused condition.

2. A combination according to claim 1 in which said contacts are mounted for rotation with said body independently of said pendulous member for circuit-making upon angular rotation of said housing and mounted for rotation independently of said housing and said pendulous member for circuit-breaking upon activation of said motor.

3. A combination according to claim 2 in which said pendulous member is disposed between said contacts for selectively closing said circuits.

4. A combination according to claim 1 further characterized by normally open manually closeable switch means in said circuits for operating said motor.

5. In a camera having an objective assembly arranged for focusing adjustment, the combination comprising:
   electrically conductive pendulous means mounted for swingingably tending to assume an angular aspect corresponding to focal distance when the base of the subject is sighted from about a picture-taking position; and
   electrically conductive means disposed in the path of said pendulous means for closing a circuit, and motive means operative during circuit closure for driving said objective assembly to focusing condition and disengaging said electrically conductive means and said pendulous means when a focused condition of said objective assembly is achieved.

6. A combination according to claim 5 in which said electrically conductive means includes a first electrical contact and a carrier mounted for movement relative said pendulous means and supporting said first electrical contact in a first position in engagement with said pendulous member for circuit closure and a second position disengaged from said pendulous member for circuit breaking.

7. A combination according to claim 6 further characterized by a power transmission arranged in driven association with said motive means for moving said carrier when said first contact is disposed in said first position to drive said objective assembly to a focused condition and said first contact to its second position.

8. A combination according to claim 6 further characterized by a second electrical contact spaced from said first contact for closing a circuit with said pendulous member to drive said motive means in a direction opposite to the direction of drive when a circuit through said first contact is closed.

9. A combination according to claim 5 in which said motive means is reversibly driven, said conductive means comprising a pair of contacts disposed in opposed relationship relative said pendulous means for reversibly driving said motive means.

10. A combination according to claim 5 in which a slip clutch couples said motive means and said objective lens assembly, said slip clutch permitting manual adjustment of said objective lens assembly.